(12) United States Patent
Gitt et al.

(10) Patent No.: US 12,097,766 B2
(45) Date of Patent: Sep. 24, 2024

(54) DUAL-CLUTCH TRANSMISSION

(71) Applicant: MERCEDES-BENZ GROUP AG, Stuttgart (DE)

(72) Inventors: Carsten Gitt, Stuttgart (DE); Andreas Kolb, Wernau (DE); Tobias Haerter, Stuttgart (DE); Juergen Schweitzer, Filderstadt (DE); Jonathan Zeibig, Aalen (DE); Peter Hahn, Stuttgart (DE); Jakub Romaniak, Stuttgart (DE); Stefan Sperrfechter, Donzdorf (DE); Klaus Riedl, Tübingen (DE); Tobias Schilder, Ludwigsburg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/021,827

(22) PCT Filed: Jul. 27, 2021

(86) PCT No.: PCT/EP2021/071003
§ 371 (c)(1),
(2) Date: Feb. 17, 2023

(87) PCT Pub. No.: WO2022/037910
PCT Pub. Date: Feb. 24, 2022

(65) Prior Publication Data
US 2023/0398854 A1 Dec. 14, 2023

(30) Foreign Application Priority Data
Aug. 20, 2020 (DE) ...................... 10 2020 005 103.0

(51) Int. Cl.
*F16H 3/00* (2006.01)
*B60K 6/36* (2007.10)
(Continued)

(52) U.S. Cl.
CPC ............... *B60K 6/547* (2013.01); *B60K 6/36* (2013.01); *B60K 6/387* (2013.01); *B60K 6/48* (2013.01); *B60K 2006/4816* (2013.01)

(58) Field of Classification Search
CPC .................................. F16H 3/006; F16H 3/093
(Continued)

(56) References Cited

U.S. PATENT DOCUMENTS 9,541,165 B2 * 1/2017 Lee ..................... F16H 3/006
9,752,654 B2 9/2017 Gitt
(Continued)

FOREIGN PATENT DOCUMENTS

DE 102011000152 A1 7/2012
DE 102011088900 A1 6/2013
(Continued)

OTHER PUBLICATIONS

International Search Report and Written Opinion mailed Sep. 29, 2021 in related/corresponding International Application No. PCT/EP2021/071003.
(Continued)

*Primary Examiner* — Ha Dinh Ho
(74) *Attorney, Agent, or Firm* — PATENT PORTFOLIO BUILDERS PLLC

(57) ABSTRACT

A dual-clutch transmission includes two clutches for respectively connecting an input shaft in a rotationally fixed manner to a sub-transmission input shaft. Two layshafts each have one output gear arranged coaxially with respect thereto. A first, second, and third forward idler gear are each arranged coaxially with respect to the one layshaft. A fourth and fifth forward idler gear are each arranged coaxially with respect to the other layshaft. One of the output gears is a larger output gear having a greater diameter or a greater number of teeth than the other, smaller output gear. The first (Continued)

forward idler gear forms a second gear stage, the second forward idler gear forms a third gear stage, etc. The gear stages have a decreasing transmission ratio in the order stated.

11 Claims, 3 Drawing Sheets

(51) Int. Cl.
   *B60K 6/387* (2007.10)
   *B60K 6/48* (2007.10)
   *B60K 6/547* (2007.10)
   *F16H 3/093* (2006.01)
(58) Field of Classification Search
   USPC .......................................................... 74/330
   See application file for complete search history.

(56) References Cited

U.S. PATENT DOCUMENTS

| | | | |
|---|---|---|---|
| 9,889,734 B2 * | 2/2018 | Yang | ......................... B60K 6/40 |
| 2006/0266141 A1 * | 11/2006 | Ogami | .................... F16H 3/006 |
| | | | 74/325 |
| 2011/0023638 A1 * | 2/2011 | Mohlin | .................... F16H 3/006 |
| | | | 74/330 |
| 2012/0227525 A1 | 9/2012 | Bartling et al. | |
| 2015/0000440 A1 | 1/2015 | Gitt | |
| 2021/0010567 A1 * | 1/2021 | Gitt | ......................... B60K 6/36 |
| 2021/0246969 A1 * | 8/2021 | Eo | .......................... F16H 57/023 |
| 2021/0310541 A1 * | 10/2021 | Eo | ........................... F16H 3/093 |
| 2022/0250608 A1 * | 8/2022 | Schilder | .................. F16H 3/006 |

FOREIGN PATENT DOCUMENTS

| | | |
|---|---|---|
| DE | 102012001948 A1 | 8/2013 |
| DE | 102013010723 A1 | 12/2014 |
| DE | 112009000016 B4 | 6/2017 |
| DE | 102018130621 A1 | 1/2019 |
| DE | 102018220721 A1 | 8/2019 |
| DE | 102018222009 A1 | 6/2020 |
| JP | 2009156305 A | 7/2009 |
| WO | 2017020976 A1 | 2/2017 |

OTHER PUBLICATIONS

Office Action created Dec. 3, 2020 in related/corresponding DE Application No. 10 2020 005 103.0.

Office Action created May 5, 2022 in related/corresponding DE Application No. 10 2020 005 103.0.

Notice of Reasons for Refusal mailed Mar. 5, 2024 in related/corresponding JP Application No. 2023-510322.

* cited by examiner

DUAL-CLUTCH TRANSMISSION

BACKGROUND AND SUMMARY OF THE INVENTION

Exemplary embodiments of the invention relate to a dual-clutch transmission, to a hybrid transmission having such a dual-clutch transmission, and to a vehicle drive system having such a dual-clutch transmission or hybrid transmission.

Dual-clutch transmissions are known in principle from the general prior art, for example from DE 10 2018 222 009 A1. With regard to further details, DE 10 2018 130 621 A1 and DE 11 2009 000 016 B4 constitute the generic state of the art. The construction is such that the input shaft of the dual-clutch transmission can be coupled to two sub-transmission input shafts, whereby each of the sub-transmission input shafts uses a layshaft to drive an output gear via which a common differential can then be driven, for example. The individual layshafts bear idler gears for selecting the respective gear stages, the two output gears of the layshafts are configured as fixed gears, whereby one of the output gears is configured as a larger output gear which has a greater diameter and/or a greater number of teeth than the other, smaller output gear.

DE 10 2012 001 948 A1 and DE 10 2011 000 152 A1 each show a dual-clutch transmission with two layshafts, wherein one of the layshafts has an output gear connected thereto in a rotationally fixed manner and the other one of the layshafts has a shiftable output gear. DE 10 2011 000 152 A1, which is considered to be generic, further shows a shiftable idler gear arranged on a hub of said shiftable output gear, which is used to form a reverse gear. In these two cases, the dual-clutch transmissions have been developed for the formation of a large number of gear stages (transmission ratios), resulting in a construction with a large axial extent.

DE 10 2013 010 723 A1 shows a dual-clutch transmission with two layshafts, wherein one layshaft also has a smaller output gear connected thereto in a rotationally fixed manner and the other layshaft has a shiftable, larger output gear, wherein the layshaft with the smaller output gear has a parking lock gear connected thereto in a rotationally fixed manner.

Two wheelsets for hybrid dual-clutch transmissions that are relatively compact compared to DE 10 2012 001 948 A1 and DE 10 2011 000 152 A1 are known from JP 2009 156305 A and DE 10 2018 220 721 A1.

Exemplary embodiments of the present invention are directed to further improve the generic construction and make it more compact and more flexible in application.

The dual-clutch transmission, used as a starting point here, thus provides a larger output gear and a smaller output gear, wherein the larger output gear has a greater diameter and/or a greater number of teeth than the other output gear. The forward idler gears for the second, third, and fourth gear stages are arranged on the layshaft having the smaller of the output gears, while those for the fifth and sixth gear are arranged on the one having the larger output gear. Both output gears then engage in known manner with an output shaft or a gear wheel attached to the latter and/or the gear wheel of a differential.

A simple and compact construction can thus be achieved, in which the gear stages have a decreasing transmission ratio in the order stated.

According to the invention, one of the output gears is configured as an idler gear connectable in a rotationally fixed manner via a shift element to the associated layshaft. The other output gear is in this case a fixed gear connected in a rotationally fixed manner to the layshaft thereof.

Within the meaning of the present invention, a rotationally fixed connection is to be understood as a connection of two rotatably mounted components, wherein these components are arranged coaxially with respect to each other and are connected to one another such that they rotate with the same angular velocity.

The dual-clutch transmission according to the invention has the advantage that it can be extremely compact and can be produced inexpensively while still having full functionality and service life.

It is further provided according to the invention that the output gear configured as idler gear is the larger output gear.

According to a very advantageous development of the dual-cutch transmission according to the invention, it can be further provided that the larger output gear is arranged on the layshaft with the fourth and fifth forward idler gear, while the other, smaller one of the output gears is arranged on the other layshaft with the first, second and third forward idler gear.

A further embodiment of the dual-cutch transmission according to the invention makes provision that a reverse idler gear is arranged on the layshaft with the larger output gear. According to a very advantageous development, this reverse idler gear can only engage with the forward idler gear for the second gear stage, i.e., with the first forward idler gear, in order to be able to shift the reverse gear accordingly if necessary. According to an advantageous embodiment, the reverse idler gear is arranged so as to rotate on a hub of the larger output gear.

A very advantageous embodiment of this makes provision here that a shift element is provided that either connects the larger output gear, configured as idler gear, to its layshaft or the reverse idler gear to the larger output gear, which is then decoupled from its layshaft. In this way, the shift element for engaging the second gear and the shift element described can be used to selectively couple the large output gear, configured as idler gear, to its layshaft or to the reverse idler gear in order to realize at least one reverse gear in the dual-clutch transmission.

According to a further very advantageous embodiment of the dual-clutch transmission according to the invention, a parking lock gear is arranged on the layshaft with the smaller of the output gears. In this way, the dual-clutch transmission can be locked accordingly when a vehicle equipped with it is parked.

In addition to the simple and compact design and the ability to be able to control the dual-clutch transmission according to the invention in a highly flexible manner, it is now the case that the latter is also extremely suited to electrification. A hybrid transmission according to the invention with such a dual-clutch transmission accordingly provides an electric unit. A combustion engine can be connected at least indirectly to the input shaft of the dual-clutch transmission via a separation clutch. An indirect connection is to be understood in this context as a connection that can be made via further elements. Typical elements between the crankshaft of the combustion engine and the input shaft of the dual-clutch transmission would be, for example, torsional vibration dampers and/or absorbers, i.e., elements for absorbing or damping torsional vibrations. These can be configured in various ways, for example with a centrifugal pendulum, a flexplate or similar.

According to one very advantageous embodiment of the hybrid transmission according to the invention, the electric unit is coupled directly or via a transmission component to the input shaft of the dual-clutch transmission. The electric unit could be arranged coaxially, for example, and drive directly on the input shaft of the dual-clutch transmission by its rotor forming part of this shaft. Alternatively, it can also be arranged with its axis of rotation parallel to the input shaft of the dual-clutch transmission or to the crankshaft of the combustion engine and, for example, act on the input shaft via a transmission component such as a gear wheel pair, a belt drive, a chain or the like. Another possibility would also be an arrangement with a vertical axle position, in which case a differential would have to be used as the gear element. This is conceivable in principle, but in practice the arrangement with parallel axles or the coaxial arrangement is to be preferred.

According to a further alternative of the hybrid transmission according to the invention, the electric unit is connected in a rotationally fixed manner to one of the sub-transmission input shafts. The electric unit then drives one of the sub-transmission input shafts of the dual-clutch transmission or, if it is operated as a generator, is then driven by it.

A further alternative is the connection of the electric unit to an idler gear on one of the layshafts. In particular, one of the forward idler gears, for example the fourth forward idler gear, can be used for connection to the electric unit, which then in turn engages with a fixed gear on the rotor shaft with the corresponding idler gear, so that it can be used via the shift element of this forward idler gear, if required, for both the motor drive and the generative operation during recuperation or by the combustion engine.

A vehicle drive system for a vehicle having a first vehicle axle, a second vehicle axle, and a dual-clutch transmission is disclosed, which can optionally be a hybrid transmission provided that a combustion engine that is or can be coupled to the dual-clutch transmission, wherein the combustion engine and the dual-clutch transmission or hybrid transmission are provided to form a drive connection with a first driven vehicle axle of a vehicle if required, wherein a second driven vehicle axle of the vehicle is driven purely electrically by at least one electric motor.

The construction can thus be equipped with both the pure dual-clutch transmission and with the hybrid drive comprising the latter in order to drive the one vehicle axle, while the other vehicle axle is driven purely electrically. This now creates numerous possibilities such as driving both vehicle axles, preferably one via the combustion engine and the other purely electrically. However, with the construction of the vehicle drive system according to the invention, other driving strategies can also be realized for the vehicle. For example, the combustion engine in combination with a hybrid transmission in one of the embodiments described above can be used to drive the electric unit as a generator, which in turn generates electricity in order to drive the at least one electric unit on the other vehicle axle. This creates the functionality of a serial hybrid drive with one, namely the second vehicle axle, which is driven accordingly. Furthermore, possibilities can be implemented which realize the operation of a parallel hybrid on the first vehicle axle through the hybrid transmission, while, for example, the second vehicle axle is only used for recuperation, or the electric units arranged there are not considered at all during the parallel hybrid operation. Another possibility arises when the dual-clutch transmission is used without electrification. In this case, the first vehicle axle is driven exclusively by the combustion engine and it becomes possible to drive the vehicle in parallel or alternatively by a purely electric motor via the second vehicle axle.

BRIEF DESCRIPTION OF THE DRAWING FIGURES

Further advantageous embodiments of the dual-clutch transmission according to the invention, the hybrid transmission according to the invention and/or the vehicle drive system also result from the exemplary embodiment, which is described in more detail below with reference to the figures, in which.

DETAILED DESCRIPTION

Figure 1:
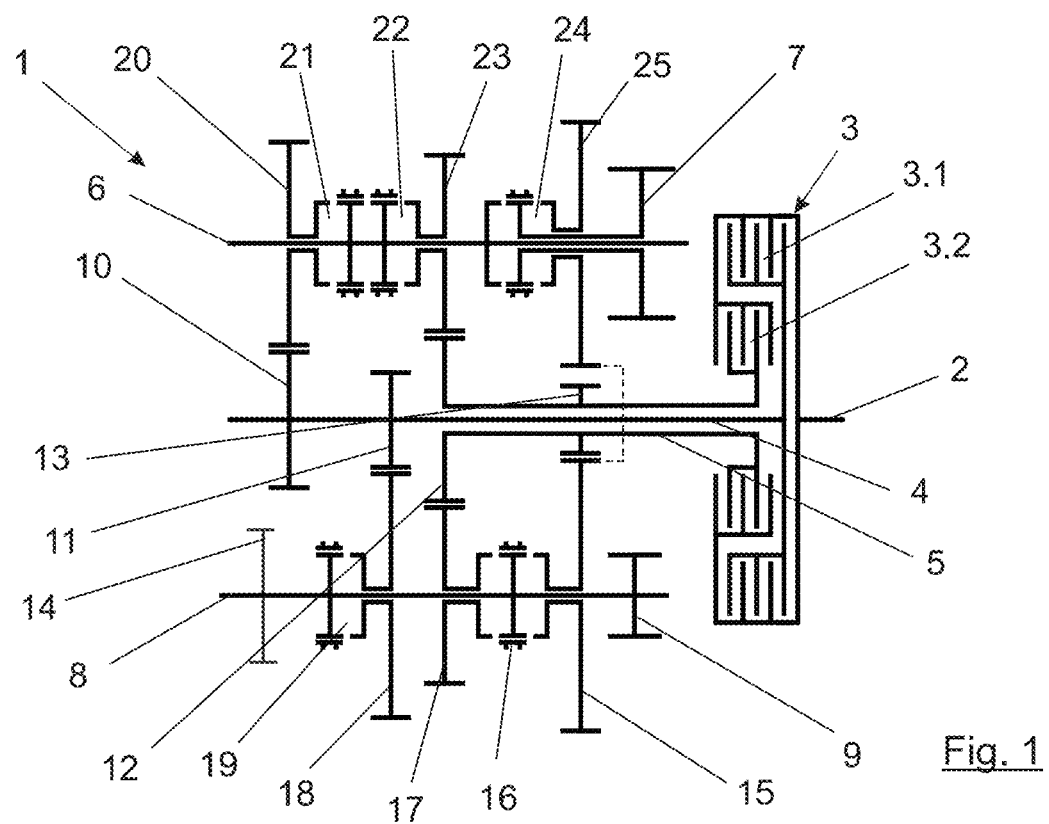
FIG. 1 shows a first possible construction of the dual-clutch transmission according to the invention in the form of a wheelset diagram.

The illustration in FIG. 1 shows a dual-clutch transmission 1 in the form of a so-called wheelset diagram. The dual-clutch transmission 1 has an input shaft labelled 2, which can be coupled detachably or in a rotationally fixed manner to a combustion engine, an electric unit and/or other drive units, for example.

The input shaft 2 is followed in the direction of power flow by a dual clutch 3, which consists of a first clutch 3.1 and a second clutch 3.2. Via the first clutch 3.1, a first sub-transmission input shaft 4 can be connected to the input shaft 2 in a rotationally fixed manner, and via the second clutch 3.2, a second sub-transmission input shaft 5 arranged coaxially thereto can be connected to the input shaft 2 of the dual-clutch transmission 1. Typically, the connection of the sub-transmission input shafts 4, 5 takes place alternately, so that the primary power flow runs either via one or the other of the sub-transmission input shafts 4, 5. In the exemplary embodiment shown here, the first sub-transmission input shaft 4 is configured as a solid shaft and the second sub-transmission input shaft 5, arranged coaxially thereto, is configured as a hollow shaft.

The dual-clutch transmission 1 also has two layshafts. A first layshaft 6 has a first output gear 7 arranged coaxially thereto, a second layshaft 8 has a second output gear 9 arranged coaxially thereto. The two output gears 7, 9 then drive, for example, a vehicle axle of a vehicle equipped with the dual-clutch transmission 1 via a gear wheel of an output shaft of the dual-clutch transmission 1, not shown here, or via a differential.

The first sub-transmission input shaft 4 bears two fixed gears 10, 11 arranged coaxially on it, the second sub-transmission input shaft 5, configured as a hollow shaft, also bears two fixed gears, labelled 12 and 13 here, arranged coaxially to it. The second layshaft 8 also bears a parking lock gear 14 which, however, is to be understood as optional. In addition, three forward idler gears are arranged on the second layshaft 8. A first forward idler gear 15 follows in the axial direction of the second layshaft 8 on the second output gear 9, which is connected thereto in a rotationally fixed manner, and meshes with the fixed gear 13 on the second sub-transmission input shaft 5. A shift element 16 then follows in the axial direction of the second layshaft 8, via which the first forward idler gear 15 can be connected to the second layshaft 8 in a rotationally fixed manner. In the axial direction of the second layshaft 8, a further forward idler gear 17 then follows, i.e., the second forward idler gear. The second forward idler gear 17 meshes with the fixed gear 12 arranged on the second sub-transmission input shaft 5 and can also be connected to the second layshaft 8 in a rotationally fixed manner by the shift element 16. The shift element 16 thus essentially has three shift positions. In the illustration in FIG. 1, it is shown in a neutral shift position. If the shift elements are disengaged to the right, it connects the first forward idler gear 15 to the second layshaft 8; if they are disengaged to the left, the shift element 16 connects the second forward idler gear 17 to the second layshaft 8.

In the axial direction of the second layshaft 8, parallel to the second forward idler gear 17, a third forward idler gear 18 then follows, which engages with the fixed gear 11 of the first sub-transmission input shaft 4. Here as well, a shift element 19 follows adjacent in the axial direction, via which the third forward idler gear 18 can be connected to the second layshaft 8 in a rotationally fixed manner, if required. The optional parking lock gear 14 already mentioned is then arranged continuing to the left in the axial direction of the layshaft 8.

The first layshaft 6 is now described in the arrangement of its gears and shift elements from left to right. It begins with a fourth forward idler gear 20, which engages with the fixed gear 10 on the first sub-transmission input shaft 4. A shift element 21 allows the fourth forward idler gear 20 to be connected to the first layshaft 6 in a rotationally fixed manner. In the axial direction of the first layshaft 6 from left to right, a further shift element 22 and a fifth forward idler gear 23 follow. This in turn engages with the fixed wheel 12 on the second sub-transmission input shaft 5 and can be connected to the first layshaft 6 in a rotationally fixed manner via the shift element 22. Adjacent to the right in the axial direction is a shift element 24 followed by a reverse idler gear 25 and the first output gear 7, which is also configured as an idler gear on the first layshaft 6. The first output gear 7 is mounted on the layshaft 6 and can be connected to it in a rotationally fixed manner via the shift element 24, if required. The reverse idler gear 25 is in turn mounted on a hub of the first output gear 7 and can be connected to the latter via the shift element 24. The shift element 24 can therefore optionally connect either the first output gear 7 to the first layshaft 6 or alternatively the reverse idler gear 25 to the first output gear 7, which is then not connected to the first layshaft 6. Like all the shift elements 16, 19, 21, 22, and 24 described so far, this shift element also has a neutral position which is correspondingly shown in the illustration in FIG. 1.

In the folded-out projected image of the wheelset diagram of FIG. 1 shown here, it cannot be seen and is therefore indicated by a dashed line that the reverse idler gear 25 engages with the first forward idler gear 15 and can thus only be driven via the latter if required, because the reverse idler gear 25 does not engage with any other gear in the dual-clutch transmission 1.

In addition to the fact that the first output gear 7 is configured as an idler gear on the first layshaft 6, another special feature of the dual-clutch transmission 1 is that the first output gear 7 is larger than the second output gear 9, which is configured as a fixed gear in the conventional manner. Larger means that it has a greater diameter and thus a greater number of teeth. A greater number of teeth alone would also suffice in principle.

The construction of the dual-clutch transmission 1 described above therefore now allows the individual gears to be shifted accordingly, with the first forward idler gear 15 being used to realize the second gear, the second forward idler gear 17 being used to realize the third gear, and the third forward idler gear 18 being used to realize the fourth gear, which is then in each case effected with an output drive transmitted via the second output gear 9, for example to the differential not shown here. The fifth and the sixth gears are accordingly realized by the fourth forward idler gear 20 and the fifth forward idler gear 23, for which the output drive is then transmitted via the first output gear 7 with the greater diameter, which is then coupled to the first layshaft 6 in a rotationally fixed manner, to the same differential. To realize the reverse gear, the reverse idler gear 25 is accordingly connected with the first output gear 7 and driven via the first forward idler gear 15, i.e., the idler gear for the second gear stage. A first reverse gear can be realized using the described path of the drive of the first forward idler gear 15, which is then connected in a rotationally fixed manner to the second layshaft 8 via the shift element 16, and the drive of the reverse idler gear 25 as well as the output drive via the first output gear 7 coupled to it. A second reverse gear can be realized by accordingly including the fourth forward idler gear 20 and the fifth forward idler gear 23, i.e., the fifth and sixth gear stage.

The first forward gear is also realized in the dual-clutch transmission with the inclusion of these two gear stages, but without a coupling of the reverse idler gear 25, but accordingly with a coupling of the first output gear 7 via the shift element 24 with the first layshaft 6. This then essentially results in the stage jump between the first and second gear stages corresponding to that between the fifth and sixth gear stages.

Figure 2:
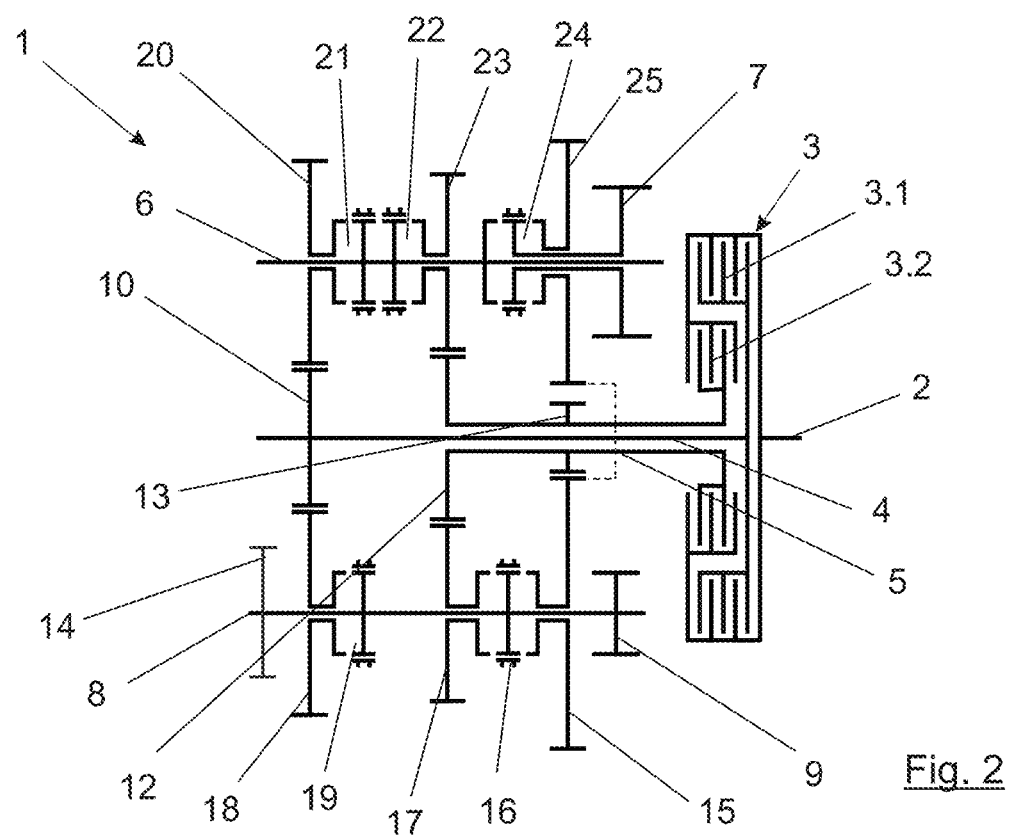
FIG. 2 shows an alternative construction of the dual-clutch transmission according to the invention in the form of a wheelset diagram.

The illustration in FIG. 2 shows an alternative construction of the dual-clutch transmission 1, with only the differences compared to the construction in FIG. 1 being discussed below. The difference lies in the fact that the second fixed gear 11 is now omitted on the first sub-transmission input shaft 4. The first fixed gear 10 therefore engages not only with the fourth forward idler gear 20 on the first layshaft 6, but also with the third forward idler gear 18 on the second layshaft 8, which for this purpose is arranged in a correspondingly mirrored arrangement of the third forward idler gear 18 and its shift element 19 compared to the arrangement in FIG. 1 on the second layshaft 8. Otherwise, the construction of the dual-clutch transmission 1 in the illustration in FIG. 2 corresponds to the construction described in FIG. 1.

This also applies to the operating mode, so that here again the stage jump from the first to second gear corresponds to that from fifth to sixth gear. In addition, the stage jumps from third to fifth gear correspond approximately to those from fourth to sixth gear, while the stage jump from second to third gear is now freely selectable in the construction shown in FIG. 2.

Figure 3:
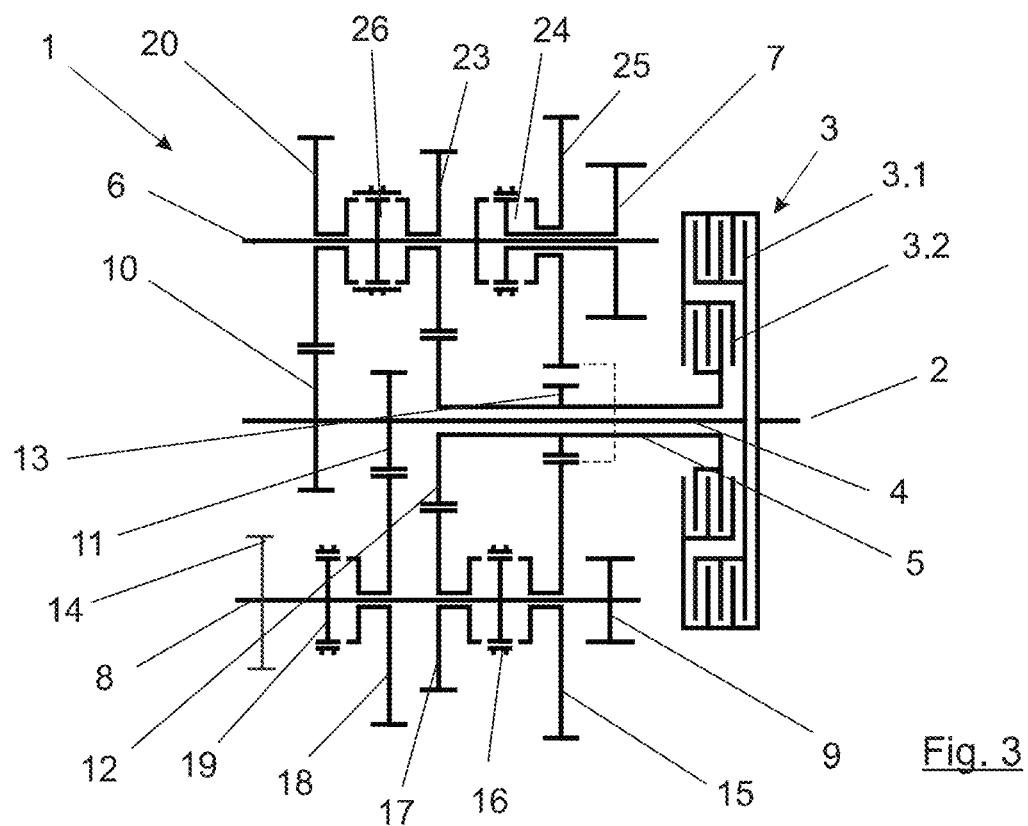
FIG. 3 shows a further alternative construction of the dual-clutch transmission according to the invention in the form of a wheelset diagram.

Another variant of the dual-clutch transmission 1 can be seen in the illustration in FIG. 3. The starting point for this is again the illustration of the dual-clutch transmission 1 from FIG. 1, so that here as well only the difference will be discussed in more detail. This difference is now that a common multiple shift element 26 is used instead of the two shift elements 21 and 22. The common multiple shift element 26 is configured in such a way that it is realized as a shift element with a sliding sleeve. Thus, without realizing a neutral position, either the fourth forward idler gear 20 or the fifth forward idler gear 23 or, in the center position of the sliding sleeve, both forward idler gears 20, 23 can optionally always be connected to the first layshaft 6. The multiple shift element 26 shifts the forward idler gears 20, 23 for the fifth and sixth gear. Everything else and the mode of operation correspond to that described in FIG. 1. Of course, the construction with the one shift element 26 instead of the shift elements 21 and 22 could also be implemented using the construction shown in FIG. 2 in which the fixed gear 10 engages with both the fourth forward idler gear 20 and the third forward idler gear 18.

Figure 4:
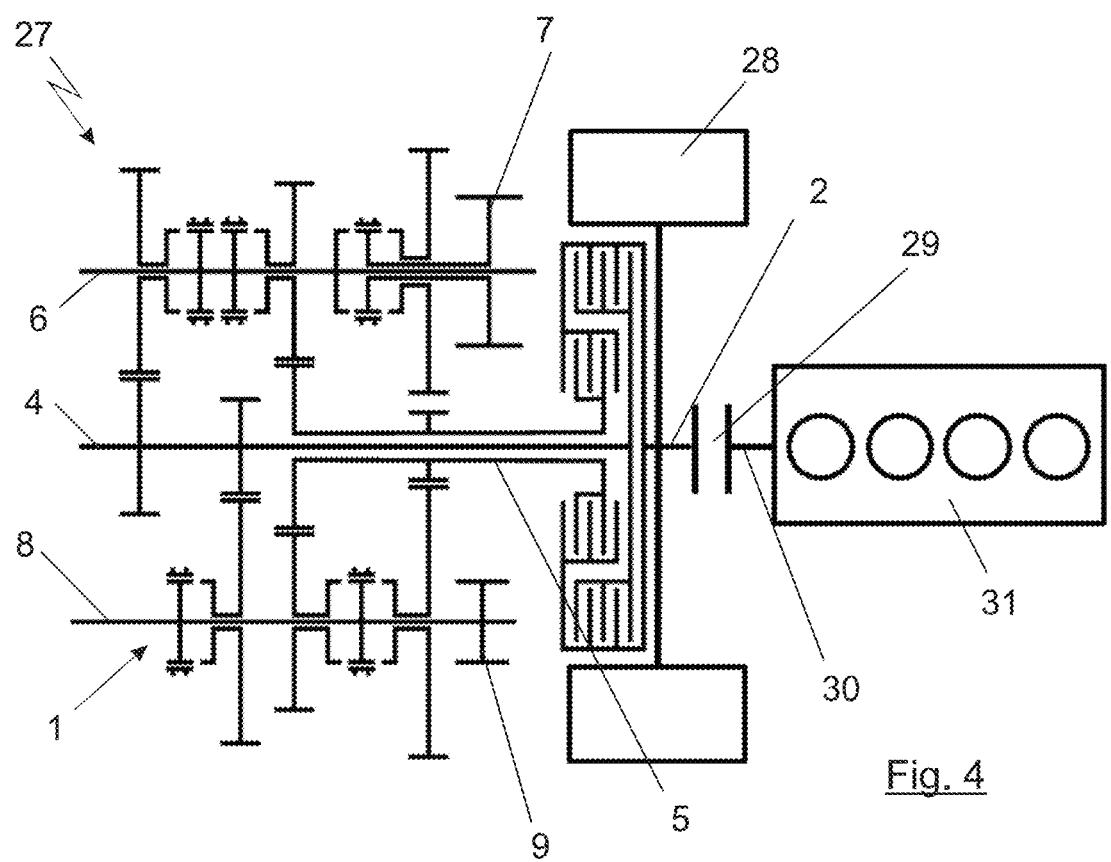
FIG. 4 shows one possible variant for electrifying the dual-clutch transmission according to the invention using the example of the construction from FIG. 1.

The dual-clutch transmission 1 in any of these embodiments is now also particularly suitable for electrification. The illustration in FIG. 4 accordingly shows a hybrid transmission 27, at the heart of which is the dual-clutch transmission 1, here in the embodiment variant according to FIG. 1, but without the optional parking lock gear 14. The other embodiments according to FIGS. 2 and 3 or a combination of these embodiments as well as the use of the parking lock gear 14 would of course also be possible here. The decisive difference now lies in the fact that an electric unit 28 is added to the dual-clutch transmission 1 to form the hybrid transmission 27, which in the exemplary embodiment shown here is arranged coaxially with respect to the dual clutch 3 and thus the input shaft 2 of the dual-clutch transmission 1. The electric unit 28 is preferably directly connected to the input shaft 2. The input shaft 2 is also connected to a crankshaft 30 of a combustion engine 31 via a separation clutch 29. This connection is typically implemented indirectly, i.e., elements for absorbing and damping torsional vibrations are provided in the area of the connection or in the area between the crankshaft 30 and the input shaft 2 of the dual-clutch transmission 1. However, this is expert knowledge, so such elements are not discussed in detail, nor have such elements been accordingly considered in the illustration of the figure.

With the clutch 29 disengaged, the construction can now be operated purely electrically by driving the dual-clutch transmission 1 via the electric unit 28 and operating its output gears 7 and 9, depending on the shift position of the shift elements. When the clutch 29 is engaged, the combustion engine 31 and the electric unit 28 can be coupled in terms of their output or the electric unit 28 can rotate without load or also be driven generatively by the combustion engine 31.

Figure 5:
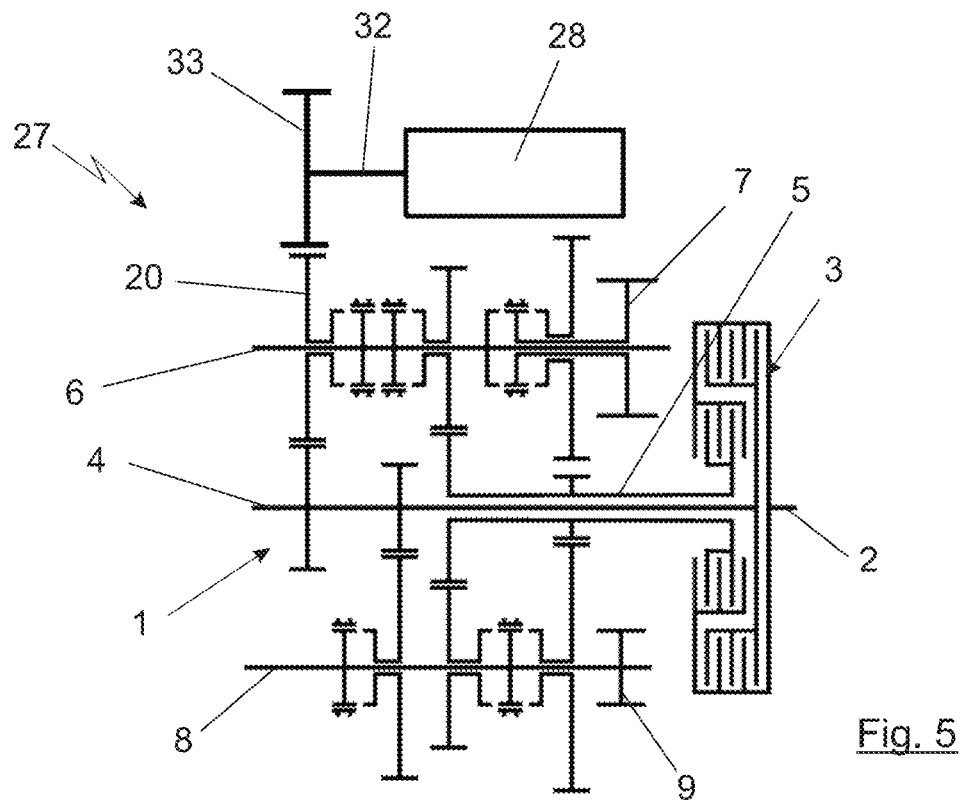
FIG. 5 shows a further variant for electrifying the dual-clutch transmission, again using the example of the embodiment as per FIG. 1.
Figure 6:
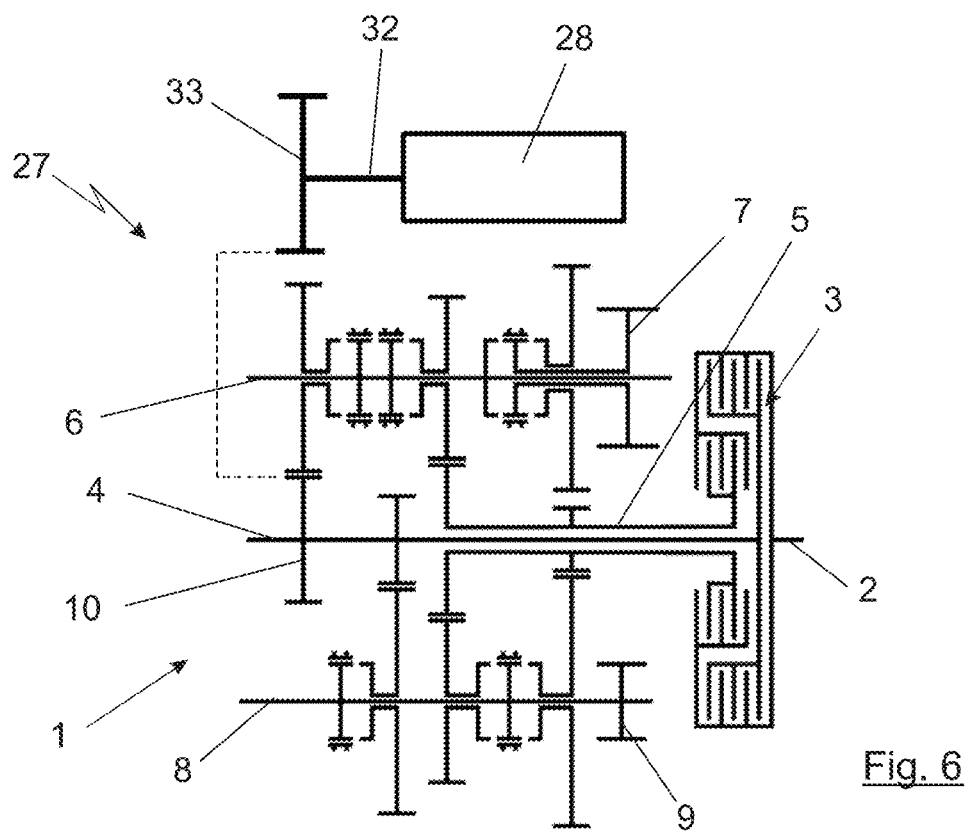
FIG. 6 shows yet a further alternative way of electrifying the dual-clutch transmission, again using the example of the embodiment of the dual-clutch transmission as per FIG. 1.

Further possibilities for integrating the electric unit 28 can be seen in the illustrations in FIGS. 5 and 6. Here. The combustion engine 31 and the separation clutch 29, which may also be optional depending on the drivetrain, are not shown. The construction of the dual-clutch transmission 1 within the respective hybrid transmission 27 again corresponds to the construction shown in FIG. 1, although this is to be understood as purely exemplary and the constructions from FIGS. 2 and 3 or a combination thereof could also be used.

In both exemplary embodiments of FIGS. 5 and 6, the electric unit 28 is now arranged with its axis parallel to the axis of the input shaft 2 and the sub-transmission input shafts 4, 5, respectively. In the exemplary embodiment of FIG. 5, a rotor shaft 32 of the electric unit 28 is coupled to a gear wheel 33 that engages with the fourth forward idler gear 20 accordingly and thus enables a flow of power from the electric unit 28 into the dual-clutch transmission 1 or from the latter into the electric unit 28, which is then operated as a generator. If it is possible to dispense with the possibility of shifting the drive connection, which in this case results in the shift element 21, then the otherwise analogous construction shown in FIG. 6 can also be used, in which the gear wheel 33, as again indicated by the dashed line, engages directly with the first fixed gear 10 on the first sub-transmission input shaft 4.

The dual-clutch transmission 1 or the hybrid transmission 27 comprising it can now form a vehicle drive system with the combustion engine 31 and/or the electric unit 28 in order to drive a vehicle not shown here. The vehicle axles of the vehicle now shown here are preferably driven in different ways. A first vehicle axle, for example, is coupled to the first output gear 7 and the second output gear 9 via the differential already mentioned several times but not shown here. This first vehicle axle can therefore be driven via the dual-clutch transmission 1 and, for example, a combustion engine 31 that is or can be coupled thereto and/or the electric unit 28. In this case, the second vehicle axle would be driven purely electrically. This means that a drive can only be realized via the combustion engine or a parallel hybrid drive via the first vehicle axle. The second axle can be driven purely electrically.

When using a hybrid transmission 27, in particular in the variant of FIG. 5 or 6, the functionality of a serial hybrid drive could thus also be realized. The combustion engine 31 would then drive the electric unit 28 via the dual-clutch transmission 1. The electric unit 28 would then provide the electric power generated in generative operation to the electric motor of the second vehicle axle of the vehicle, not shown here, so that the vehicle can be driven purely electrically via the second vehicle axle in the functionality of a serial hybrid.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A dual-clutch transmission comprising:
   an input shaft;
   first and second clutches configured to respectively connect the input shaft in a rotationally fixed manner to one sub-transmission input shaft;
   two layshafts arranged coaxially with respect to each other, wherein each of the two layshafts include an output gear;

a first, second and third forward idler gear, which are each arranged coaxially with respect to a second one of the two layshafts; and a fourth and fifth forward idler gear, which are each arranged coaxially with respect to a first one of the two layshafts;

wherein a first output gear of the output gears is larger than a second output gear of the output gears, wherein the first output gear has a greater diameter or a greater number of teeth than the second output gear, wherein the first forward idler gear forms a second gear stage, the second forward idler gear forms a third gear stage, the third forward idler gear forms a fourth gear stage, the fourth forward idler gear forms a fifth gear stage, and the fifth forward idler gear forms a sixth gear stage, wherein the second through sixth gear stages have a decreasing transmission ratio in the order stated, wherein the larger first output gear is an idler gear that is connectable in a rotationally fixed manner via a shift element to the first one of the two layshafts, wherein the smaller second output gear is a fixed gear connected in a rotationally fixed manner to the second one of the two layshafts, wherein the second gear stage, the third gear stage, and the fourth gear stage are each output via the smaller second output gear, and the fifth gear stage and the sixth gear stage are each output via the larger first output gear, wherein a reverse idler gear is arranged on the first one of the two layshafts so as to rotate on a hub of the larger output gear, wherein the reverse idler gear only engages with the first forward idler gear.

2. The dual-clutch transmission of claim 1, wherein the larger second output gear is arranged on the first one of the two layshaft with the fourth and fifth forward idler gear, and the smaller output gear is arranged on the second one of the two layshafts with the first, second, and third forward idler gear.

3. The dual-clutch transmission of claim 2, wherein in an axial direction of the second one of the two layshafts, the first forward idler gear follows the second output gear, the second forward idler gear follows the first forward idler gear, and the third forward idler gear follows the second forward idler gear.

4. The dual-clutch transmission of claim 1, wherein the shift element is configured to either connect the larger output gear to the first one of the two layshafts or the reverse idler gear to the larger first output gear, which is then decoupled from the first one of the two layshafts.

5. The dual-clutch transmission of claim 1, further comprising:

a parking lock gear on the second one of the two layshafts.

6. A hybrid transmission, comprising:

an electric unit; and a dual-clutch transmission coupled to the electric unit, wherein the dual-clutch transmission comprises an input shaft;

first and second clutches configured to respectively connect the input shaft in a rotationally fixed manner to one sub-transmission input shaft;

two layshafts arranged coaxially with respect to each other, wherein each of the two layshafts include an output gear;

a first, second and third forward idler gear, which are each arranged coaxially with respect to a second one of the two layshafts; and a fourth and fifth forward idler gear, which are each arranged coaxially with respect to a first one of the two layshafts;

wherein a first output gear of the output gears is larger than a second output gear of the output gears, wherein the first output gear has a greater diameter or a greater number of teeth than the second output gear, wherein the first forward idler gear forms a second gear stage, the second forward idler gear forms a third gear stage, the third forward idler gear forms a fourth gear stage, the fourth forward idler gear forms a fifth gear stage, and the fifth forward idler gear forms a sixth gear stage, wherein the second through sixth gear stages have a decreasing transmission ratio in the order stated, wherein the larger first output gear is an idler gear that is connectable in a rotationally fixed manner via a shift element to the first one of the two layshafts, wherein the smaller second output gear is a fixed gear connected in a rotationally fixed manner to the second one of the two layshafts, wherein the second gear stage, the third gear stage, and the fourth gear stage are each output via the smaller second output gear, and the fifth gear stage and the sixth gear stage are each output via the larger first output gear, wherein a reverse idler gear is arranged on the first one of the two layshafts so as to rotate on a hub of the larger output gear, wherein the reverse idler gear only engages with the first forward idler gear.

7. The hybrid transmission of claim 6, wherein the electric unit is coupled or is couplable directly or via at least one transmission component to the input shaft of the dual-clutch transmission.

8. The hybrid transmission of claim 6, wherein the electric unit is coupled with an idler gear to one of the two layshafts.

9. The hybrid transmission of claim 6, wherein the electric unit is coupled or is couplable to one of the sub-transmission input shafts.

10. A vehicle drive system, comprising:

a combustion engine;

two driven vehicle axles;

a dual clutch transmission coupled to the combustion engine and the two driven vehicle axles, the dual clutch transmission comprising an input shaft;

first and second clutches configured to respectively connect the input shaft in a rotationally fixed manner to one sub-transmission input shaft;

two layshafts arranged coaxially with respect to each other, wherein each of the two layshafts include an output gear;

a first, second and third forward idler gear, which are each arranged coaxially with respect to a second one of the two layshafts; and a fourth and fifth forward idler gear, which are each arranged coaxially with respect to a first one of the two layshafts;

wherein a first output gear of the output gears is larger than a second output gear of the output gears, wherein the first output gear has a greater diameter or a greater number of teeth than the second output gear, wherein the first forward idler gear forms a second gear stage, the second forward idler gear forms a third gear stage, the third forward idler gear forms a fourth gear stage, the fourth forward idler gear forms a fifth gear stage, and the fifth forward idler gear forms a sixth gear stage, wherein the second through sixth gear stages have a decreasing transmission ratio in the order stated, wherein the larger first output gear is an idler gear that is connectable in a rotationally fixed manner via a shift element to the first one of the two layshafts, wherein the smaller second output gear is a fixed gear connected in a rotationally fixed manner to the second one of the two layshafts, wherein the second gear stage, the third gear stage, and the fourth gear stage are each output via the smaller second output gear, and the fifth gear stage and the sixth gear stage are each output via the larger first output gear, wherein a reverse idler gear is arranged on the first one of the two layshafts so as to rotate on a hub of the larger output gear, wherein the reverse idler gear only engages with the first forward idler gear.

11. The vehicle drive system of claim 10, further comprising:

an electric unit coupled to the dual-shaft transmission.

\* \* \* \* \*